United States Patent
Olson et al.

[19]

[11] Patent Number: 5,995,980
[45] Date of Patent: Nov. 30, 1999

[54] SYSTEM AND METHOD FOR DATABASE UPDATE REPLICATION

[76] Inventors: Jack E. Olson, 3335 Far View Dr.; Thomas G. Price, 2007 Manana, both of Austin, Tex. 78730

[21] Appl. No.: 08/685,219

[22] Filed: Jul. 23, 1996

[51] Int. Cl.$^6$ .................................................. G06F 17/30
[52] U.S. Cl. ............................ 707/201; 707/203; 707/10
[58] Field of Search .................................. 707/201, 203, 707/10

[56] References Cited

U.S. PATENT DOCUMENTS

| | | | |
|---|---|---|---|
| 4,631,673 | 12/1986 | Haas et al. | 707/100 |
| 4,714,992 | 12/1987 | Gladney et al. | 707/206 |
| 4,714,995 | 12/1987 | Materna et al. | 707/201 |
| 4,809,170 | 2/1989 | Leblang et al. | 395/703 |
| 5,357,629 | 10/1994 | Dinnis et al. | 707/203 |
| 5,600,832 | 2/1997 | Eisenberg et al. | 707/203 |
| 5,649,195 | 7/1997 | Scott et al. | 707/201 |
| 5,737,601 | 4/1998 | Jain et al. | 707/201 |
| 5,819,251 | 10/1998 | Kremer et al. | 707/1 |

*Primary Examiner*—Wayne Amsbury
*Attorney, Agent, or Firm*—Fulbright & Jaworski, L.L.P.; J. Scott Denko

[57] ABSTRACT

The present invention provides a new, high-performance system and method for updating databases or other data compilations with changes entered in a source database or data compilation. Updates are preprocessed to reduce system update demands while increasing update flexibility for remote processing sites. Data update records are captured or collected and extracted into one or more channel or other criterion-specific batches. Transaction boundaries within a batch are collapsed, and the records coalesced into a package comprising a sequence of updates that reflect the cumulated impact of the extracted records. In a preferred embodiment, the batched records are sorted by extracted sort key entries and the package is converted to the physical format of respective targets. The created update package is, therefore, organized and physically formatted in correspondence with the target database. The update package is then directly applied to the target database without resort to the traditional front door processing through the local database manager. The processing typically required in database update replication is, thereby, avoided and the update process significantly streamlined. The update packages may be moved to targets by a variety of methods. The packages can be conveyed across network or Internet connections or between disconnected computers. The packages may be stored in computer readable media such as disks or CD ROMs, for example, from which the packages may be accessed by target systems. The update packages may also be made available through modems to field users or clients to allow flexible update scheduling. The invention results in a high performance, database update system and method that significantly reduces system update burdens while increasing update flexibility and minimizing impacts from failures during updating. Updates are performed in significantly less time with a system and method that requires little administrative oversight and minimal personnel training.

32 Claims, 7 Drawing Sheets

SYSTEM AND METHOD FOR DATABASE UPDATE REPLICATION

TECHNICAL FIELD

The present invention relates to computer databases and, in particular, to a system and method for updating target databases with updates entered in a source database.

BACKGROUND OF THE INVENTION

Database information is, typically, both created and examined. Some database users create data, while other users may merely examine data. For example, an automatic teller machine ("ATM") typically adds or modifies database data, while a trend analyst seeking marketing profiles or fraud evidence, generally examines data created by others.

Databases are often replicated to reduce contention or access to a primary database or provide stand alone work systems and spaces. Replicated databases provide work fields that allow users and clients to create or inspect data without limiting access by others to a primary database. For clients interested in only specific aspects of the primary database, replicas of particular regions or fragments can be provided to avoid absorbing excess resources. Replicated databases also provide a backup in the event of media failure.

Database consistency becomes an important issue when multiple replicas exist simultaneously with a primary database. The replicas must be updated to predictably reflect changes entered in the primary database.

A variety of techniques have been employed to maintain database consistency. Any update technique should demonstrate reasonable throughput and consume limited resources. Amending replica databases to reflect changes entered in a primary database should not unduly limit either replica or primary database access.

Copy replication has been employed to ensure predictable database consistency. Although resource consumptive, copy replication is useful when extensive record changes have been made. In copy replication, copies of the primary database are mapped into database replicas associated with particular users or clients that seek access to the information of the primary database. A copy of the primary is created and is typically applied to the replica database through the local database management system controlling the local replica database. In accordance with a predetermined schedule, database access is locked and the replica is overwritten with the data of the updated primary. The replica database thus reflects changes entered by other clients and users on a predictable basis. Copy replication typically results in inefficient use of system resources and adversely impacts database availability while consuming significant amounts of processing resources and time. A significant flow of messages is required to implement copy replication and maintained, as well as changed, database records are overwritten during copy replication.

Update replication is another known technique employed to manage database consistency. Update replication is more flexible than copy replication and typically updates only records that change data. It can also be structured to update only records of interest to particular database users or clients.

In one known type of update replication, a log skimmer monitors a transaction record log for data changes. When a change of interest is identified, the change is imposed on the target database through the local database manager. When a client is interested in only periodic, rather than immediate updates, applicable changes are queued in structured query language ("SQL") statements corresponding to a sequence of transactions. The channel between the queue and the application process that specifies the changes is blocked until indicated by the update schedule. When scheduled, the block is removed and the application program sequentially specifies a transaction and corresponding subject record to the local database manager which, in response, brings the applicable data page of the target database out of storage for processing in a buffer according to the specified transaction.

Once updated, the processed page is over-written into the appropriate area of the target database. This process continues down through the pending queue. If numerous changes are queued, the update process consumes, therefore, significant resources.

Although more precise than copy replication, update replication is a complicated system and employs extra processes not required for copy replication. Update replication also serializes changes and suffers, therefore, from wasted handling overhead and transactions.

The serialized transactions corresponding to queued changes to a particular record do not efficiently express the cumulated impact of the individual transactions on the particular record. For example, numerous queued changes to a particular record could, at the conclusion of the sequence of changes, leave the record unchanged or even deleted. Nevertheless, update replication executes the sequence of operations corresponding to the queued changes despite an unchanged or deleted end result. Consequently, when a record is ultimately unchanged or deleted by a series of changes, the intervening corresponding sequence of individual transactions has wasted system resources.

Multiply queued changes to a particular record are not organized, rather than organized in correspondence with the physical storage organization of the database, further wasting processing effort. A particular page may be brought out of storage and overwritten in the target multiple times during an update because the changes are not organized according to physical storage location.

The multiple queued transactions implicit in update replication consume significant resources. A "transaction" is a unit of work performed by an application program. In one transaction interface technique, as an example of the processing undertaken in database page handling, a transaction log is maintained in nonvolatile storage. Every completed transaction is recorded as a log record including UNDO and REDO components. The UNDO component records a database record before it is changed by a transaction and the REDO component of the log record is a copy of the record after the change has been imposed. Each record update results in the writing of an UNDO and REDO record in the transaction log. Assuming completion of the transaction which updates a particular record, the database manager will copy the requisite page into the work buffer where the recovery process will use the transaction log REDO record to update the record of interest. The local database manager will then write the updated page to the target database. The creation of both REDO and UNDO records allows backward recovery to restore records to their prior state if a transaction is aborted. If a transaction associated with a REDO record aborts, the record data from the UNDO record is logged as a REDO record and is applied to the database page to back-out the original update. The log record can also contain a COMMIT field indicating the successful conclusion of the associated transaction. Consequently, the database manager is significantly burdened if required to implement a lengthy queue of transactions implicit in the queued update replication process.

Consequently, what is needed is an efficient and robust update system that reduces update replication demands on system resources. The update method should also be flexible enough to update specific records and readily adaptable to a variety of organizational or system configurations without undue administrative or maintenance effort.

SUMMARY OF THE INVENTION

An object of the present invention is, therefore, to provide a system and method for updating a target database or other data compilation with informational changes entered in a source database or other data compilation.

A further object of this invention is to provide an update system and method that can selectively update records having particular attributes while reducing demands on system resources.

A still further object of this invention is to provide an update system and method that reduces the time required to implement updates and reduces administrative and training burdens on organizations.

The present invention provides a new, high-performance system and method for updating databases or other data compilations with changes entered in a source database or data compilation. The invention is particularly useful in database replication processes, but can be employed to advantage for managing data consistency wherever data changes are made available.

In the present invention, updates are preprocessed to reduce system update demands while increasing update flexibility for remote processing sites. Data update records are captured or collected and extracted into one or more channel or other criterion-specific batches. Transaction boundaries within a batch are collapsed, and the records coalesced into a package comprising a sequence of updates that reflect the cumulated impact of the extracted records. In a preferred embodiment, the batched records are sorted by extracted sort key entries and the package is converted to the physical format of respective targets. The created update package is, therefore, organized and physically formatted in correspondence with the target database. The update package is then directly applied to the target database without resort to the traditional front door processing through the local database manager. The processing typically required in database update replication is, thereby, avoided and the update process significantly streamlined.

The update packages may be moved to targets by variety of methods. The packages can be conveyed across network or Internet connections or between disconnected computers. The packages may be stored in computer readable media such as disks or CD ROMs, for example, from which the packages may be accessed by target systems. The update packages may also be made available through modems to field users or clients to allow flexible update scheduling. The invention results in a high performance, database update system and method that significantly reduces system update burdens while increasing update flexibility and minimizing impacts from failures during updating. Updates are performed in significantly less time with a system and method that requires little administrative oversight and minimal personnel training.

In a preferred embodiment, data management records that change data are captured from the system log and queued in a captured data set for further, criteria-specific, selection and processing. Channel-relevant records that satisfy predetermined criteria are extracted, along with their associated sort key entries into corresponding extract data sets to create extract update batches. Extract update batches are accordingly sorted to create sorted extract update batches organized in correspondence with the storage structure of the target database. The records within each channel-associated and sorted extract data set are combined or eliminated and existing transaction boundaries are collapsed to coalesce the represented data changes into a sequence of updates reflecting the cumulated impact of the extract update batches. The resulting package is converted to native target format allowing the target to be updated without resort to the target database manager. A package description file is generated to track the pre-processing conducted to yield the resulting update packages constructed for each target channel of interest.

In an implementation of a preferred embodiment, a CAPTURE machine captures data management records to create a capture data set made available for further selection. An EXTRACT machine examines the capture data set to select channelrelevant records that satisfy predetermined WHERE clauses. The selected records are written, along with appropriate index sort keys, to corresponding extract data sets. A BUILD machine, which may optionally be included in EXTRACT, coalesces the records to collapse transaction boundaries and eliminate unneeded and superfluous records to construct an update sequence reflecting the cumulated impact of the extracted records. The resulting package is converted to the physical format of the target to generate an update package that can be applied directly to the target, by-passing the database management system. A package description file is prepared to track the pre-processing conducted to yield the resulting update package. The CAPTURE, EXTRACT, and BUILD machines are comprised of software instructions stored in a computer and executed by a computer. In a preferred embodiment, an apply machine applies the constituent DELETES, UPDATES, and INSERTS of a typical update package to the target in a rational order and executes appropriate index changes.

The present invention preprocesses updates intended for reflection in target data files and databases. Changed records are collected or captured, index components are sorted, and the batch cumulated and reconfigured in target physical format and applied as a single update transaction package. Consequently, update replication burdens are minimized while update flexibility and convenience are increased.

The invention may be embodied as instructions in computer readable media such as tapes, disks, and CD ROMs, for example. The invention is applicable wherever database availability is valued and consistency between source and target databases is desired. The present invention is particularly helpful in systems having limited resources for update processing, and can find ready employment in large systems as an adjunct to already existing update systems. By preparing a package embodied in a computer readable magnetic medium reflecting available updates, the present invention also offers individual satellite or remote clients or units update scheduling flexibility to update when convenient.

The provided invention is particularly suited for systems in which only some of the many records in large databases are to be changed or examined between updates. For example, the historical records of large, comprehensive health plan databases are regularly modified in only a percentage of the many constituent records and, typically, are usually examined only in fragmentary or regional form.

Price changes in product databases, manufacturing error pattern analyses systems, and bank customer marketing or fraud targeting systems are a few of the many more readily recognized uses for the present invention.

DETAILED DESCRIPTION OF THE PREFERRED EMBODIMENT

The present invention provides a new, high-performance system and method for updating databases or other data compilations with changes entered in a source database or data compilation. The invention is particularly useful in database replication processes, but can be employed to advantage for managing data consistency wherever data changes are made available.

Figure 1:
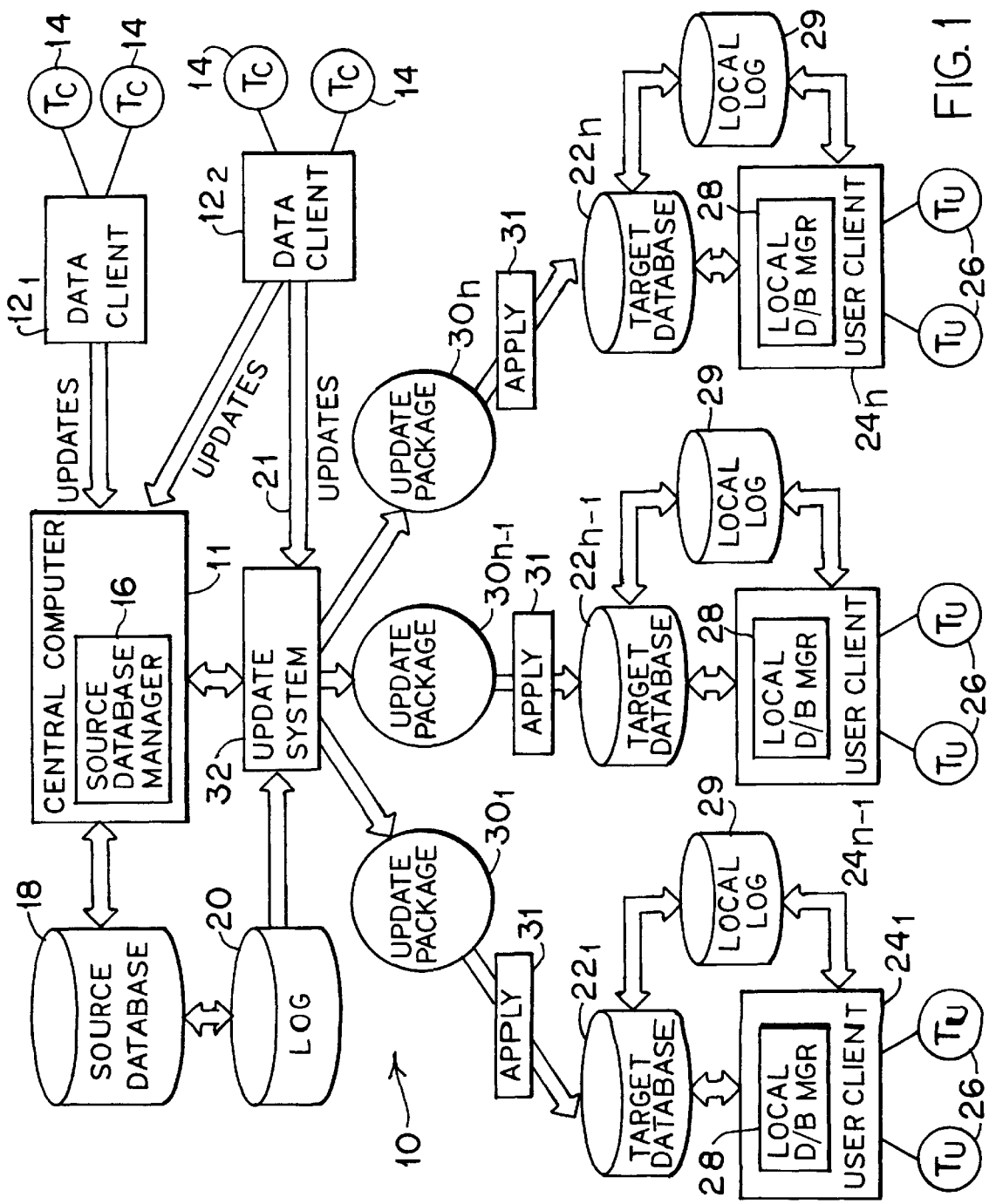
FIG. 1 is a block diagram of an exemplar system in which the present invention is employed to advantage.

FIG. 1 is a block diagram illustrating system 10 that employs target and source databases and supports database update processing in accordance with the present invention. As shown in FIG. 1, exemplar system 10 provides source data creation capabilities through data clients $12_1$ and $12_2$, data creation terminals 14, and central computer 11. Data clients $12_1$ and $12_2$ may be single host computers or may be connected to a number of terminals or nodes 14 further identified in FIG. 1 as terminals Tc. Data clients $12_1$ and $12_2$ and user terminals 14 may be personal computers, work stations, modems connected to remote users, automated teller machines or other of a variety of data creating devices. Computer 11 may be any processor-controlled computer adapted to system management. Computer 11 may comprise a type of a machine similar to data clients $12_1$ and $12_2$ or may be a typical mainframe computer.

Computer 11 includes source database manager 16 through which computer 11 manages source database 18. Data changes or updates entered from data clients $12_1$ and $12_2$ or terminals 14 are reflected in source database 18 and recorded in log 20. Log 20 may record recent or aged record changes.

Complete or fragmentary replicas of source database 18 are provided to local target databases $22_1$–$22_n$ for use. By user clients $24_1$–$24_n$ and terminals 26. When more than one of user clients $24_1$–$24_n$ and terminals 26 share a local database, access is directed under the control of respective local database managers 28. Local logs 29 store transaction records relevant to their respective local databases.

As indicated in FIG. 1, target databases $22_1$–$22_n$ are updated in system 10 with update packages $30_1$–$30_n$, respectively. Each of update packages $30_1$–$30_n$ is adapted and created by update system 32 for direct application through apply machine 31 to the corresponding target database $22_1$–$22_n$. Apply machine 31 is comprised of software instructions stored in a computer or computer memory and executed by a computer. Update system 32 is comprised of software machines CAPTURE, EXTRACT, and BUILD. The software machines CAPTURE, EXTRACT, and BUILD are comprised of software instructions stored in a computer and executed by a computer such as computer 11, for example. Although update system 32 is is comprised of software machines stored and executed by a computer, for clarity of the present exposition, update system 32 is given its own reference block 32 in FIG. 1. Those skilled in the art will recognize that machines CAPTURE, EXTRACT, and BUILD may be stored and executed in different computers.

In the embodiment depicted in FIG. 1, update system 32 is employed to update target databases $22_1$–$22_n$ with record changes or updates entered in source database 18, but those skilled in the art will recognize that update system 32 may be logically positioned to provide update services in either direction. Update system 32 is adaptable to provide update processing appropriate for any of a variety of source and target databases or data compilations wherever data or records require updating.

Figure 2:
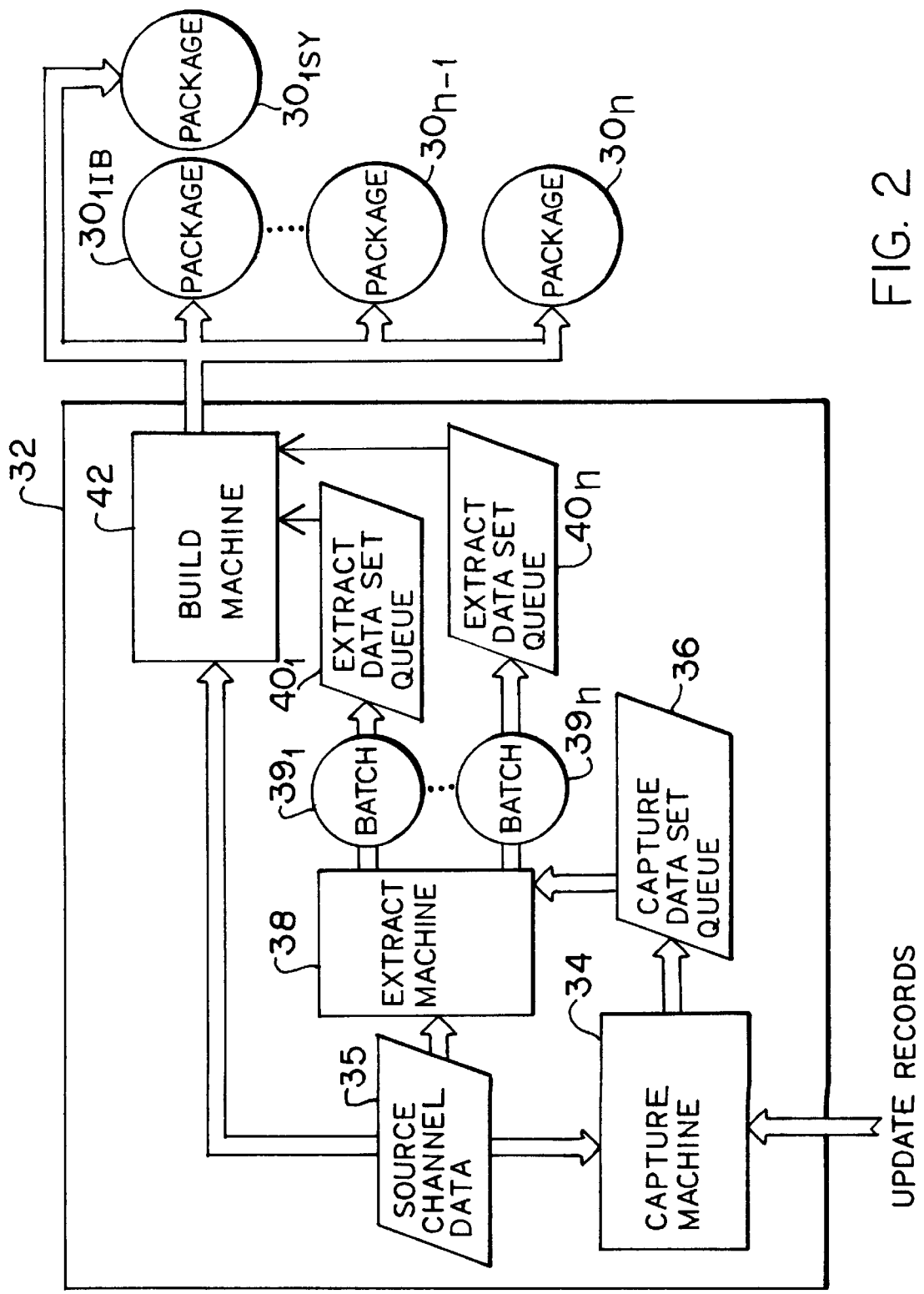
FIG. 2 is a block diagram of a preferred implementation of the update system of the present invention as employed in the system of FIG. 1.

FIG. 2 is a block diagram of update system 32 as employed in the system of FIG. 1. With reference to FIG. 2, CAPTURE machine 34 locates source database table channel data 35 to determine channels to be updated and examines updated records from log 20 to select appropriate data management records for deposit in buffer space identified as capture data set queue 36. CAPTURE machine 34 may, in alternative embodiments, capture changes from sources other than log 20. For example, changes could be captured directly from clients $12_1$ and $12_2$ without resort to log examination, as represented in FIG. 1 by path 21 between client $12_2$ and update system 32.

With continuing reference to FIG. 2, EXTRACT machine 38 is initialized with channel definitions and predetermined user parameters and a separate output extract data set queue $40_1$–$40_n$ is opened for each database source channel. EXTRACT machine 38 will typically open in buffer storage, multiple extract data set queues $40_1$–$40_n$ to individually correspond to multiple channels having update data. The records deposited in capture data set queue 36 by CAPTURE machine 34 are evaluated by EXTRACT machine 38 to determine whether particular channel and WHERE statement criteria are satisfied. EXTRACT machine 38 extracts an appropriate sort key for the index components of each of the records selected from capture data set queue 36 and writes the keys along with the selected record into the corresponding extract data set queue $40_1$–$40_n$ creating individual extract update batches $39_1$–$39_n$ that correspond to the channels of interest.

When EXTRACT machine 38 has created an extract update batch for each database channel of interest, BUILD machine 42 sorts the extract update batch according to the index keys created by EXTRACT machine 38. Sorting adapts the extract update batch to the organizational structure of the target database. BUILD machine 42 collapses transaction boundaries of the extract update batch and coalesces the records into a sequence of updates expressing the cumulated impact of the extract update batch to create one of the reduced-transaction update packages $30_1$–$30_n$ corresponding to the extract update batches $39_1$–$39_n$ in each of extract data set queues $40_1$–$40_n$, BUILD machine 42 may, alternatively, be considered a part of EXTRACT machine 38, but it is more convenient to articulate BUILD as a separate machine dedicated to create update packages $30_1$–$30_n$ from the extract update batches $39_1$–$39_n$ in extract data set queues $40_1$–$40_n$, respectively.

In a preferred embodiment, BUILD machine 42 converts the coalesced update packages into the physical format of the particular target database to create a single transaction update package adapted to the physical formatting of the respective target database. In other implementations of the present invention, pre-processing by cumulating records still achieves processing economy even though the package may be applied through the local database manager. Single-transaction update packages in target format eliminate, however, update processing through respective local database managers and avoids, therefore, the attendant locking and logging during the update process. Formatted, single-transaction update packages are, consequently, preferred.

If system 10 services targets of various formats, such as ORACLE©, IBM©, and SYBASE© databases for example, BUILD machine 42 constructs more than one update package from the extract update batches $39_1$–$39_n$ in each of the extract data set queues $40_1$–$40_n$. In a preferred embodiment, therefore, for the extract update batch $39_1$–$39_n$ in each extract data set queue $40_1$–$40_n$, there will be at least one corresponding update package $30_1$–$30_n$, and, if a variety of target formats are serviced, BUILD machine 42 will construct an update package in each target format, from the extract update batches $39_1$–$39_n$ in extract data set queues $40_1$–$40_n$. FIG. 2 illustrates the creation of more than one formatted update package for the extract update batch $39_1$ in extract data set queue $40_1$ by indicating update packages $30_{1IB}$ and $30_{1SY}$ representing exemplar IBM© and SYBASE© format update packages, respectively, both of which are generated from the extract update batch $39_1$ stored in extract data set queue $40_1$ by BUILD machine 42.

Figure 3:
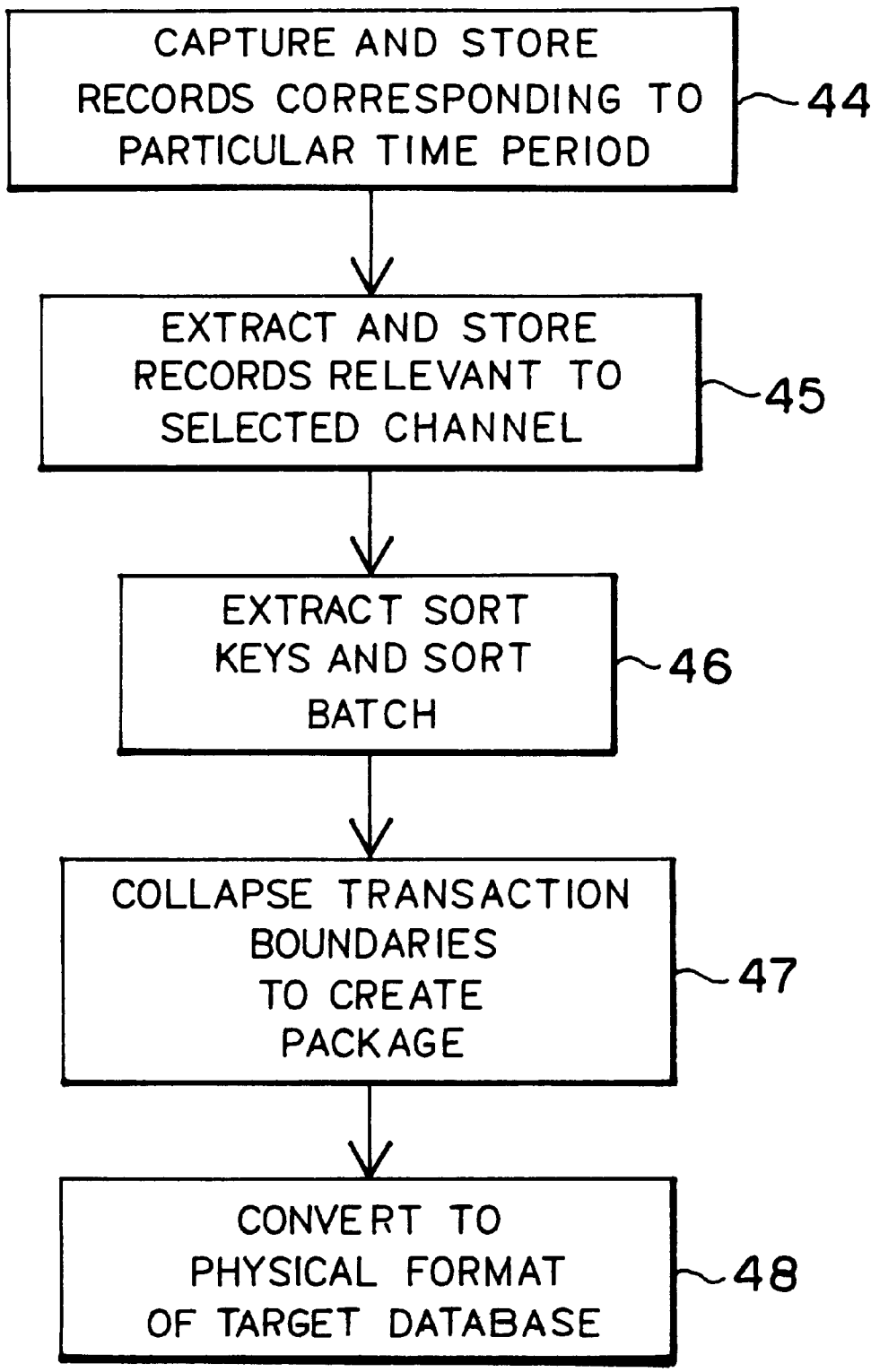
FIG. 3 is a flow chart illustrating the steps performed in a preferred implementation of the present invention employed to create an update package directly applicable to a target database.

FIG. 3 is a flow chart illustrating the steps performed in a preferred implementation of the present invention employed to create an update package directly applicable to a target database. As shown in step 44, a series of records within a particular time of interest are collected or captured and stored in an allocated record queue. From the collected records, those records relevant to a selected channel of interest are extracted to create an extract update batch stored in an allocated extract queue as indicated in step 45. In step 46, sort key entries are extracted and the batch is sorted. In step 47, transaction boundaries of the extract update batch are collapsed to create an update package. The package is converted to the physical format of the target database in step 48 to create an update package that can be applied to the target database by direct modification of the physical storage of the target.

Figure 4:
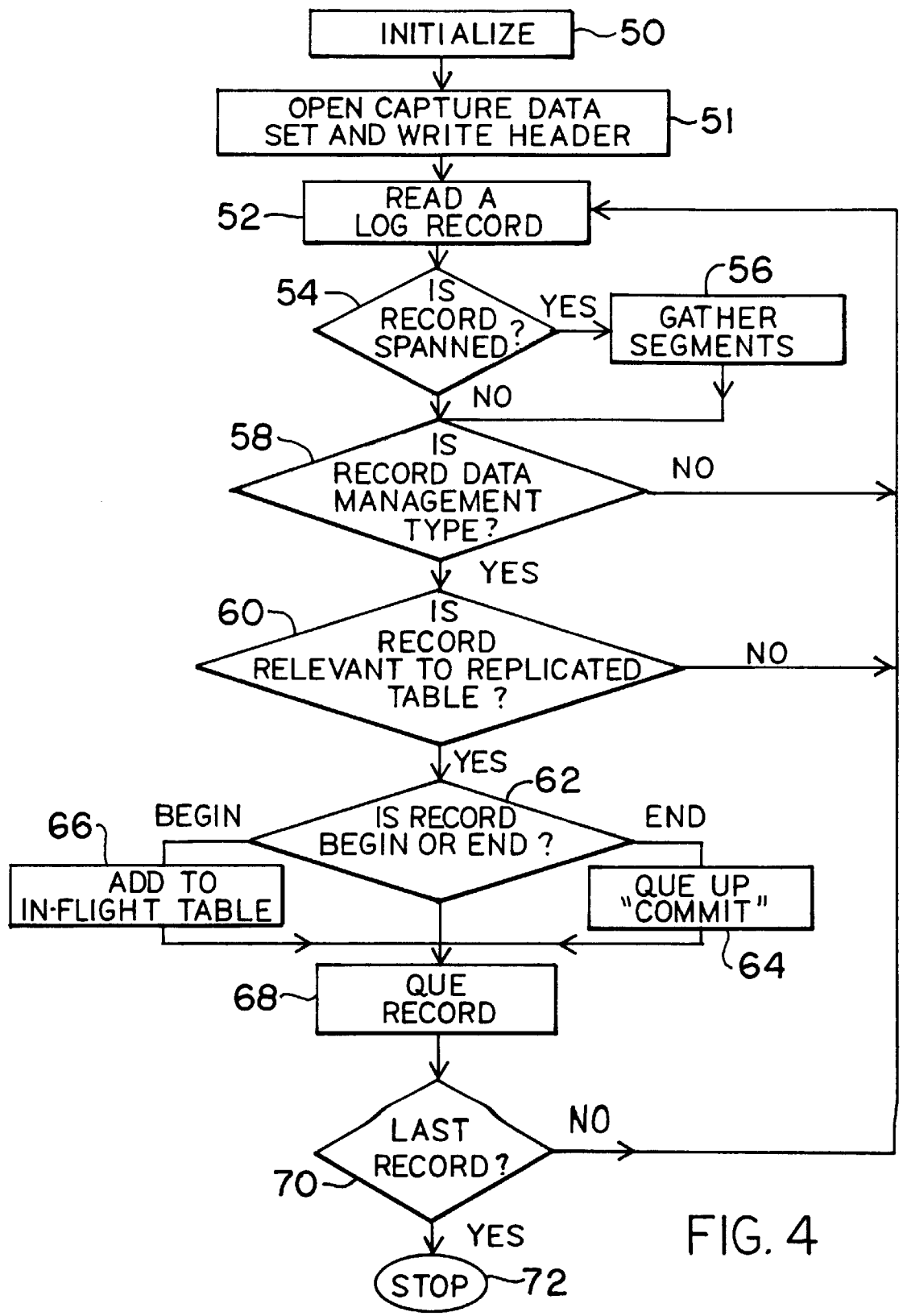
FIG. 4 is flow chart indicating the steps performed by the CAPTURE machine employed by the update system shown in FIG. 2.

FIG. 4 is flow chart indicating the steps performed by CAPTURE machine 34 in a preferred implementation of the present invention. CAPTURE machine 34 orients itself to the system environment and conducts a number of operations to initialize in step 50. During step 50 CAPTURE machine 34 locates database channels by reading DB2 tables, for example. Any applicable compression dictionaries and edit and field processes are loaded, the log records are located by reading the boot strap data set (BSDS) and a restart facility is acquired and a check for conflicts is conducted as part of the initialization indicated by step 50. In step 51, a capture data set, such as capture data set queue 36 depicted in FIG. 2, is opened as a repository for captured records and a header is written to define the space used for CAPTURE 34 output.

In step 52, CAPTURE 34 finds and opens the log data set of log 20 and, using the BSDS, the desired starting place is found in the log data set and the first subject record is read. In step 54, CAPTURE machine 34 determines if the subject record is spanned, and if so, all the record segments are gathered in step 56. The record is evaluated for type in step 58, and if the record is of a type that changes or adds data (i.e. data management type) the record is evaluated for relevance to a channel of current interest in step 60. If the record does not change or add data, CAPTURE 34 returns to step 52 where the next log record is read.

If the record is relevant to a channel of interest, CAPTURE 34 determines in step 62 if the record is a BEGIN or END transaction and either queues a COMMIT, as indicated in step 64, or adds the record to the in-flight table as shown in step 66. For users interested in transaction consistency, the in-flight table will be later checked by EXTRACT machine 38. If the record is not relevant, CAPTURE machine 34 returns to step 52 to read the next record. In step 68, the surviving subject record is queued and CAPTURE machine 34 determines if a next record is to be read in step 70 and either stops as indicated by step 72, or returns to step 52 to read the next record. At the end of the process shown in FIG. 4, CAPTURE machine 34 has opened and populated a capture data set queue 36 for use by EXTRACT machine 38.

Figure 5:
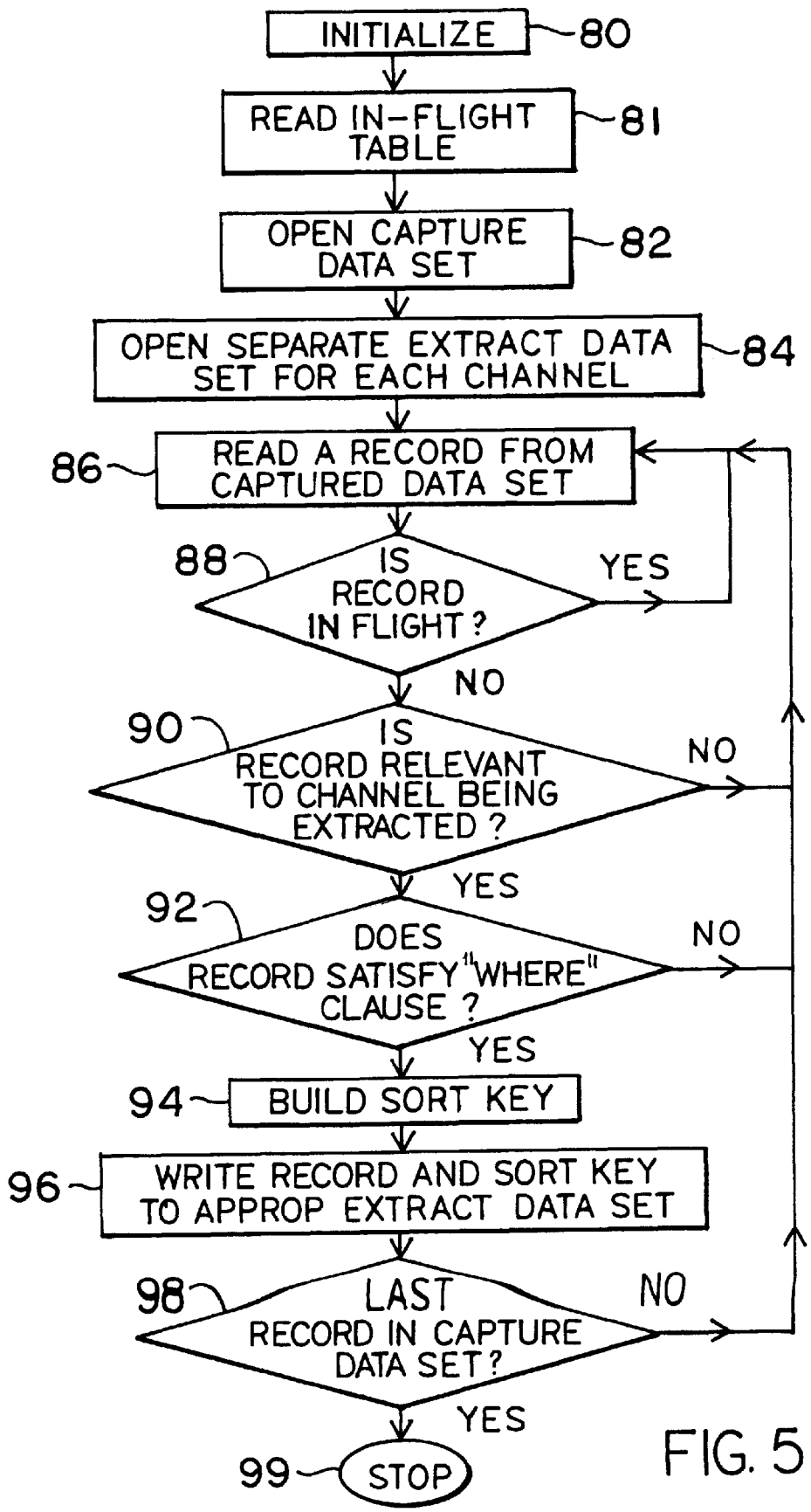
FIG. 5 is a flow chart describing the steps performed by the EXTRACT machine employed by the update system shown in FIG. 2.

FIG. 5 is a flow chart illustrating the steps performed by EXTRACT machine 38 to collect extract update batches $39_1$–$39_n$ from the records available in the capture data set queue 36. EXTRACT machine 38 initializes in step 80 by getting user defined channel definitions such as restrictions and source tables, for example, from the database tables. The character conversion table is read and user parameters for extraction are determined, and, as indicated in optional step 81, the in-flight table is read.

In step 82, the capture data set is opened to read the records queued by CAPTURE machine 34, and in step 84, an extract data set is opened for each channel of interest. EXTRACT machine 38 reads the first subject record from capture data set queue 36 as indicated by step 86. For users interested in transaction consistency, step 88 indicates that EXTRACT machine 38 can, if requested or required by the user of update system 32, evaluate the in-flight status of the subject record. If in-flight status is checked, records that indicate COMMIT are passed to the channel-relevance determination in step 90, while records that indicate a begin transaction are dropped by EXTRACT machine 38 which returns to step 86 to acquire the next subject record from capture data set queue 36.

If transaction consistency is not requested or required, EXTRACT machine 38 determines channel-relevance in step 90 without checking an in-flight table. Those records found to be relevant are evaluated against criterion-determining. WHERE clauses in step 92. In step 94, sort key entries for components of the record are created. The sort keys will be used to reorder the components of the statements of the update package by database page, minimizing update package application time. The record and corresponding sort keys are written to the appropriate extract data set queue $40_{1-40n}$, and, if the queued record concluded the capture data set, EXTRACT machine 38 stops as shown in step 99. If the capture data set includes another record for potential extraction, EXTRACT 38 machine returns to step 86 to read the next subject record. At the end of the process shown in FIG. 4, EXTRACT machine 38 has opened and populated each of extract data set queues $40_1$–$40_n$ with corresponding extract update batches $39_1$–$39_n$ for use by BUILD machine 42.

Figure 6:
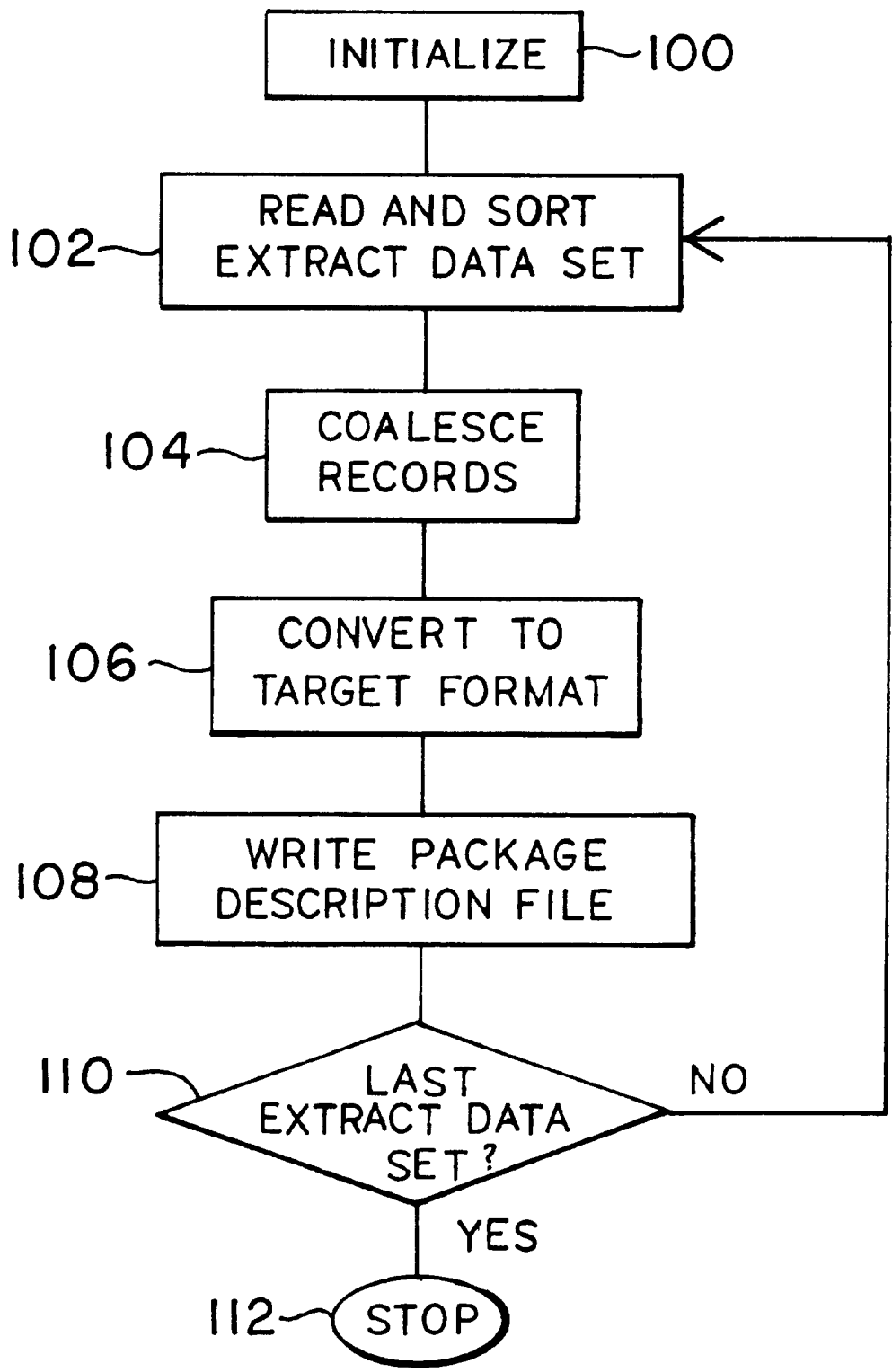
FIG. 6 is a flow chart indicating the steps performed by the BUILD machine employed by the update system shown in FIG. 2.

The execution steps performed by BUILD machine 42 are illustrated in the flow chart shown in FIG. 6. BUILD machine 42 initializes in step 100 by reading channel definitions from, for example, DB2 tables. The collating sequence table indicating sort ordering is also read during step 100 and any needed character conversion tables are read. In step 102, BUILD machine 42 sorts a selected extract update batch, such as extract update batch $39_1$, for example, prepared by EXTRACT machine 38. Extract update batch $39_1$ is sorted according to the indexing and storage strategy of the target database.

In step 104, the records from extract update batch $39_1$ are coalesced to combine or eliminate superfluous records into a package comprising a sequence of updates expressing the cumulated impact of the records of the extract data set. For example, if extract update batch $39_1$ includes a series of updates to a particular record, and the updates are followed by a DELETE, BUILD machine 42 will collapse the series of updates and DELETE into a single DELETE and eliminate the prior updates. In step 106, the sequence of updates are converted to the physical format of the target. If multiple targets are to be updated, an update package is prepared in each of the target formats. In a preferred embodiment, format conversion of INSERT records comprises building a target formatted row image of the record. Format conversion for DELETE records comprises placing in the package the primary key of the record to be deleted in target format and format conversion for UPDATE records comprises including in the package the primary key and a set of columns to be changed and new value of target format. In step 108, a package description file is prepared to describe the process taken to yield the update package and, in step 110, BUILD machine 42 either concludes its work or returns to step 102 to read and sort the next extract update batch.

Once prepared, an update package $30_1$–$30_n$ is applied to the respective target database $22_1$–$22_n$ through apply machine 31 in, preferably, one transaction. Because the update packages $30_1$–$30_n$ are in target native physical format, they can be applied directly to the physical storage of the respective target databases without resort to the corresponding local database managers 28. Consequently, significant resources are conserved, and time consumed during updating is correspondingly reduced. Within an update package, the DELETES, UPDATES, and INSERTS may themselves be imposed in particular order to provide further improvement.

Figure 7:
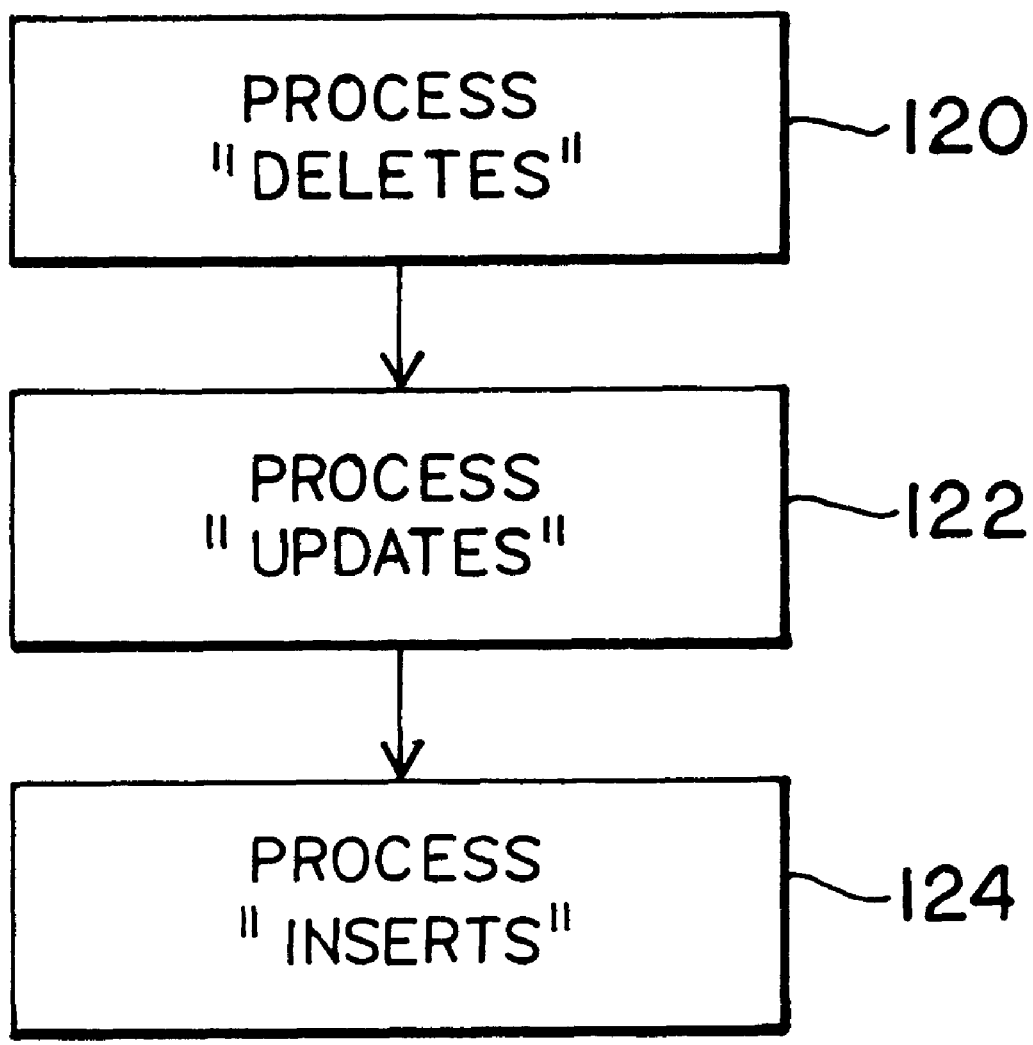
FIG. 7 is a flow chart illustrating the update sequence used to apply the update package to a target database in a preferred implementation of the present invention.

FIG. 7 indicates a preferred processing order of the constituent operations of an update package as executed by apply machine 31 earlier depicted in FIG. 1. With reference to FIG. 7, apply machine 31 preferably processes DELETES first as shown in step 120. This may free room in a unit storage area or page. The index is used to find the keys for the row to be deleted and a pointer is applied to the record which is then deleted. UPDATES are then applied as shown in step 122. With an update, a record may get longer and if there is not enough room on the page, an overflow marker must be processed. UPDATES are processed by looking up the primary key of the row to be updated and finding the pointer to the record and updating. In step 124, apply machine 31 processes the INSERTS last using the appropriate row image.

It should be apparent to those having skill in the art that the invention may be embodied in a variety of forms without departing from its essential characteristics or its spirit. Iterations of invention embodiments may be employed, for example, to provide bi-directional updating. The described embodiments are illustrative and not to be considered restrictive and the scope of the invention is, therefore, to be indicated by the following claims.

We claim:

1. An update system for creating an update package applicable to update a second database to make it consistent with a first database, said update system comprising:

a transaction record queue for storing records representing changes made to the first database;

a capture machine for capturing changes made to the first database and storing in the transaction record queue, records representing data changes made to the first database;

a first extract record queue for storing records extracted from the transaction record queue;

an extract machine for selecting from the transaction record queue and storing in the first extract record queue, a first extract update batch comprising records relevant to a first channel of the second database; and a build machine for coalescing the first extract update batch stored in the first extract record queue into a single-transaction package comprising a sequence of one or more updates expressing the cumulated impact of the first extract update batch to create a first update package applicable to the second database.

2. The system of claim 1 in which the extract machine selects and stores in the first extract record queue, a first extract update batch comprising records relevant to a first channel of the second database and that satisfy a preselected criterion.

3. The system of claim 1 further comprising a second extract record queue, and in which the extract machine selects from the transaction record queue and stores in the second extract record queue, a second extract update batch comprising records relevant to a second channel of the second database.

4. The system of claim 3 in which the second extract update batch comprises records relevant to a second channel of the second database and satisfy a preselected criterion.

5. The system of claim 1 further comprising an application machine that applies the first update package to the second database.

6. In a data processing system having source and target data compilations and a log record of entries representing transacted changes made to the source data compilation, an update system for updating the target data compilation to make it consistent with the source data compilation, said update system comprising:

a log entry storage;

a capture machine for selecting from the log record and storing in the log entry storage, entries representing data changes made in the source data compilation;

an extract entry storage;

an extract machine for selecting from the entries stored in the log entry storage and storing in the extract entry storage, entries relevant to a selected attribute in the target data compilation;

a build machine for building an update package comprising a sequence of statements expressing the cumulated impact of the entries in the extract storage; and an apply machine for applying, in a single transaction, the update package to the target data compilation to make it consistent with the source data compilation.

7. The system of claim 6 in which the extract machine builds plural sort keys associated with the index components of the entries stored in the extract entry storage and the build machine employs the plural sort keys to arrange the sequence of statements of the update package in correspondence with the paging structure of the target data compilation.

8. The system of claim 6 in which the update package comprising a sequence of statements expressing the cumulated impact of the entries in the extract storage is applied to the target data compilation in more than one transaction.

9. The system of claim 6 in which the build machine converts the sequence of statements of the update package into the format of the target data compilation.

10. A method for creating an update package applicable to update a second database to make it consistent with a first database, said method comprising the steps of:
    allocating a transaction record queue for storing records representing changes made to the first database;
    capturing changes made to the first database and storing in the transaction record queue, records representing data changes made to the first database;
    allocating a first extract record queue for storing records extracted from the transaction record queue;
    extracting from the transaction record queue and storing in the first extract record queue, a first extract update batch comprising records relevant to a first channel of the second database; and
    collapsing transaction boundaries in the first extract update batch and coalescing the first extract update batch into a single-transaction package comprising a sequence of one or more updates expressing the cumulated impact of the first extract update batch to create a first update package.

11. The method of claim 10 further comprising the step of converting the first update package to the physical format of the second database to create a formatted update package having the format of the second database.

12. The method of claim 11 further comprising the step of converting the first update package to the format of a third database to create a further formatted update package having the format of the third database.

13. The method of claim 12 further comprising the step of applying the further formatted update package directly to the third database.

14. The method of claim 13 further comprising the step of applying, in order, DELETE, UPDATE, and INSERT updates of the further formatted update package directly to the third database.

15. The method of claim 11 further comprising the step of applying the formatted update package directly to the second database.

16. The method of claim 15 further comprising the step of applying, in order, DELETE, UPDATE, and INSERT updates of the formatted update package directly to the second database.

17. The method of claim 10 further comprising the steps of:
    associating sort keys with the records of the first extract update batch, the sort keys corresponding to the storage strategy of the second database; and
    sorting the records according to the sort keys.

18. The method of claim 10 further comprising the steps of:
    allocating a second extract record queue for storing records extracted from the transaction record queue;
    extracting from the transaction record queue and storing in the second extract record queue, a second extract update batch comprising records relevant to a second channel of the second database; and
    collapsing transaction boundaries in the second extract update batch and coalescing the second extract update batch into a second single-transaction package comprising a sequence of one or more updates expressing the cumulated impact of the second extract update batch to create a second update package.

19. A method of updating a second database to make it consistent with a first database, the method comprising the step of:
    applying a first update package created in accordance with the method of claim 10 to a second database.

20. In an organization employing first and second databases a method to make the second database consistent with the first database, the method comprising the steps of:
    allocating a first storage area;
    capturing and storing in the first storage area, X entries representing data changes made to the first database, X being a number;
    allocating a second storage area;
    extracting from the first storage area and storing in the second storage area, an extract update batch comprising Y entries representing changes relevant to a channel of the second database, Y being a number;
    coalescing the first extract update batch into a package comprising a sequence of Z updates expressing the cumulated impact of the extract update batch to create an update package, Z being a number less than Y; and
    applying the update package to the second database.

21. The method of claim 20 further comprising the step of formatting the update package into the format of the second database and applying the formatted package directly to the second database in a single transaction.

22. The method of claim 21 further comprising the step of making the formatted package available through a modem.

23. The method of claim 20 further comprising the step of arranging the sequence of Z updates in correspondence with the paging system of the second database.

24. The method of claim 23 further comprising the step of formatting the update package into the format of a third database.

25. A computer readable medium comprising programming instructions for updating a second database to reflect changes made to a first database, the instructions comprising:
    instructions for allocating a transaction record queue for storing records representing changes made to the first database;
    instructions for capturing changes made to the first database and storing in the transaction record queue, records representing data changes made to the first database;
    instructions for allocating an extract record queue for storing records extracted from the transaction record queue;
    instructions for extracting from the transaction record queue and storing in the extract record queue, an extract update batch comprising records relevant to a channel of the second database; and
    instructions for collapsing transaction boundaries in the extract update batch and coalescing the extract update batch into a single-transaction package comprising a sequence of one or more updates expressing the cumulated impact of the extract update batch to create an update package.

26. The medium of claim 25 in which the medium is a magnetic disk.

27. The medium of claim 25 in which the medium is a CD ROM.

28. The medium of claim 25 in which the medium is a magnetic tape.

29. A computer readable medium comprising programming instructions for updating a second database to reflect changes made to a first database, the instructions comprising:

instructions for capturing from a transaction log and storing in a transaction record space, transaction log records representing data changes made to a first database;

instructions for extracting from the transaction record space and storing in an extract record space, transaction log records relevant to a channel of a second database; and instructions for coalescing the transaction log records stored in the extract record space into a single-transaction batch comprising a sequence of one or more update records expressing the cumulated impact of the log records stored in the extract record space to create an update package applicable to the second database.

30. The medium of claim 29 in which the medium is a magnetic tape.

31. The medium of claim 29 in which the medium is a CD ROM.

32. The medium of claim 29 in which the medium is a magnetic tape.

* * * * *